US008183978B2

(12) United States Patent
Hamamura

(10) Patent No.: US 8,183,978 B2
(45) Date of Patent: May 22, 2012

(54) ELECTRONIC KEY APPARATUS FOR A VEHICLE

(75) Inventor: Yukihiro Hamamura, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 995 days.

(21) Appl. No.: 11/802,337

(22) Filed: May 22, 2007

(65) Prior Publication Data

US 2008/0204192 A1 Aug. 28, 2008

(30) Foreign Application Priority Data

Feb. 26, 2007 (JP) ................................. 2007-045643

(51) Int. Cl.
*B60R 25/00* (2006.01)
(52) U.S. Cl. ..................... 340/5.72; 340/10.1; 340/10.2; 340/10.3
(58) Field of Classification Search .................. 340/5.72
See application file for complete search history.

(56) References Cited

U.S. PATENT DOCUMENTS

| | | | | | |
|---|---|---|---|---|---|
| 4,509,093 | A | * | 4/1985 | Stellberger | 340/5.26 |
| 5,252,965 | A | * | 10/1993 | Gidwani et al. | 340/5.23 |
| 6,265,962 | B1 | * | 7/2001 | Black et al. | 340/10.2 |
| 6,697,616 | B1 | * | 2/2004 | Heinz et al. | 455/424 |
| 6,946,949 | B2 | * | 9/2005 | Heide et al. | 340/5.61 |
| 7,429,914 | B2 | * | 9/2008 | Carlson et al. | 340/286.01 |
| 7,504,992 | B2 | * | 3/2009 | Pilcher et al. | 342/125 |
| 7,623,663 | B2 | * | 11/2009 | Farris et al. | 380/239 |
| 2003/0098615 | A1 | | 5/2003 | Fischer et al. | |
| 2005/0103835 | A1 | * | 5/2005 | Kunito et al. | 235/375 |
| 2006/0125605 | A1 | * | 6/2006 | Fischer et al. | 340/10.41 |
| 2006/0186996 | A1 | * | 8/2006 | Sato | 340/10.2 |
| 2007/0085658 | A1 | * | 4/2007 | King et al. | 340/5.72 |
| 2007/0200670 | A1 | * | 8/2007 | McBride et al. | 340/5.72 |

FOREIGN PATENT DOCUMENTS

| | | |
|---|---|---|
| DE | 10155123 A1 | 5/2003 |
| JP | 2000-54699 A | 2/2000 |
| JP | 2006-108981 A | 4/2006 |

OTHER PUBLICATIONS

German Office Action for Corresponding German Patent Application No. 10 2007 027 348.9-51, dated Jun. 30, 2010.

* cited by examiner

*Primary Examiner* — Brian Zimmerman
*Assistant Examiner* — Omer S Khan
(74) *Attorney, Agent, or Firm* — Sughrue Mion, PLLC

(57) ABSTRACT

Provided is an electronic key apparatus for a vehicle, capable of suppressing power consumption, reducing a verification time, and improving responsiveness of an on-vehicle device. The electronic key apparatus for a vehicle includes an on-vehicle device and a plurality of portable devices. In the electronic key apparatus for a vehicle for activating a control device when ID codes of the portable devices are verified, an on-vehicle device includes a transmission/reception unit, a memory, a reception strength determining unit, a drive unit, and a CPU for sequentially transmitting first to third request signals according to a matching result of verification between the request signal and the answering signal, sequentially receiving first to third answering signals from the portable devices, sequentially comparing each of the received answering signals with the first to third answering signals stored in the memory every time the answering signals are received, and outputting a control signal to the drive unit when an ID code of the finally registered portable device is verified. The CPU transmits the second request signal when a reception determination signal is received even in a case where the first answering signal cannot be normally detected.

8 Claims, 6 Drawing Sheets

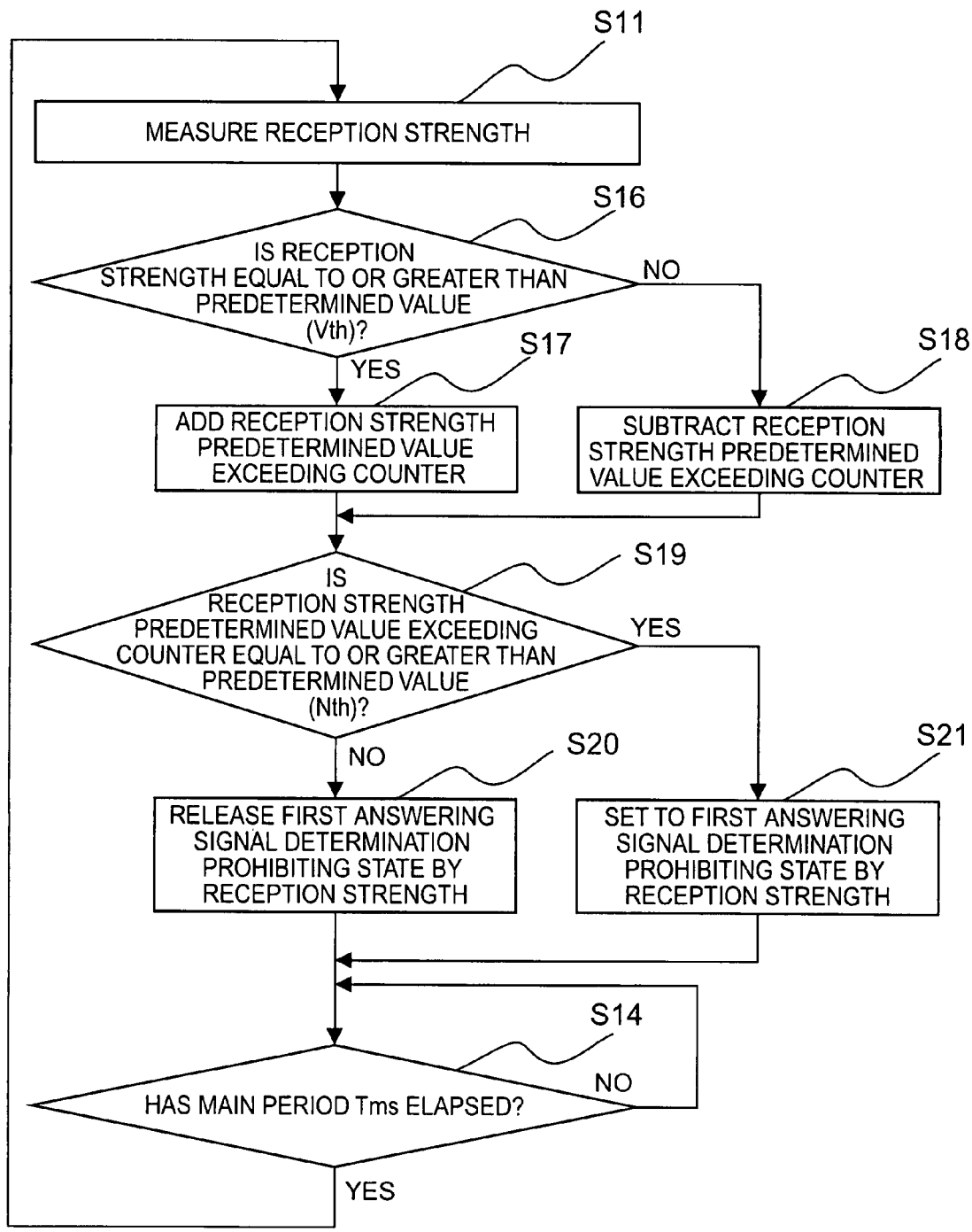

ELECTRONIC KEY APPARATUS FOR A VEHICLE

BACKGROUND OF THE INVENTION

1. Field of the Invention

The present invention relates to an improvement of an electronic key apparatus for vehicle, which verifies ID codes through communications between portable devices and on-vehicle devices, for locking or unlocking of doors, a steering wheel, and a trunk of the vehicle, starting an engine, or the like.

2. Description of the Related Art

Up to now, there is an electronic key apparatus with which, to lock or unlock doors of a vehicle or start an engine of the vehicle, a user inserts a key into a keyhole and turns the key. Further, there is another key apparatus with which, like a so-called card key, while a key is kept in a pocket or bag of a user of a vehicle, wireless communication is established between an on-vehicle device and the key (portable device) without the key being touched, and an ID code sent from the portable device is compared with an ID code stored in the on-vehicle device. In this key apparatus, if the ID codes match, the on-vehicle device unlocks or locks the doors of the vehicle only by touching a sensor mounted to a doorknob (for example, see JP 2000-54699 A and JP 2006-108981 A).

Further, in the above-mentioned electronic key apparatuses, the on-vehicle device periodically transmits a radio signal for making a request to perform verification. When a portable device registered in advance approaches a vicinal area from which the vehicle can be unlocked, the portable device responds to the radio signal and the on-vehicle device verifies the response signal sent from the portable device (for example, see JP 2000-54699 A).

In the above-mentioned JP 2000-54699 A, in order to improve responsiveness for locking/unlocking doors of a vehicle through the communication between the portable device and the on-vehicle device, the on-vehicle device improves the responsiveness while improving a power saving property by changing a transmission period according to a reception strength.

Further, in JP 2006-108981 A, through the communication between the portable device and the on-vehicle device, it is judged whether a noise is generated based on the reception strength in order to store causes for an abnormal control and operation of the locking/unlocking of the doors.

However, in a case where the signal is destroyed due to interference of radio waves which have been simultaneously transmitted or generation of a noise, ID verification according to the signal cannot be performed. Accordingly, there has been a possibility that the locking/unlocking of the doors is delayed until subsequent verification is made or the locking/unlocking of the door is not operated.

SUMMARY OF THE INVENTION

The present invention has been made in view of the above-mentioned circumstances, and therefore, an object of the present invention is to obtain an electronic key apparatus for a vehicle capable of suppressing power consumption, reducing a verification time, and improving responsiveness of an on-vehicle device by eliminating a need for reattempting verification communication even in a case where an answering signal corresponding to a request signal sent from a registered portable device cannot be normally received or in a case where the signal cannot be normally received due to a noise.

According to an aspect of the present invention, there is provided an electronic key apparatus for vehicle including: an on-vehicle device mounted on the vehicle; a plurality of portable devices possessed by a user; and a control device mounted on the vehicle, in which: the electronic key apparatus for a vehicle activates the control device in a case where the on-vehicle device has verified ID codes for the portable devices through communication between the portable devices; the on-vehicle device includes: transmission/reception means for communicating with the portable device; a memory for storing a first answering signal, a second answering signal, and a third answering signal containing the ID codes for the portable devices; reception strength determining means for outputting a reception determination signal for determining that the first answering signal from the portable devices has been received, based on a reception strength of a reception signal; drive means for outputting a control signal to the control device of the vehicle; and control means for sequentially transmitting, to the portable devices through the transmission/reception means, a first request signal for determining a registered portable device, a second request signal for identifying a number of the registered portable device, and a third request signal for verifying an ID code for the registered portable device, according to a matching result of comparison between the request signals and the answering signals, sequentially receiving the first answering signal, the second answering signal, and the third answering signal from the portable devices based on the transmission, sequentially comparing the first answering signal, the second answering signal, and the third answering signal sent from the portable devices with the first answering signal, the second answering signal, and the third answering signal stored in the memory every time the first answering signal, the second answering signal, and the third answering signal are received from the portable devices, and controlling the drive means in a case where the ID code for the portable device finally registered is verified based on the comparison result; and the control means transmits the second request signal to the portable devices through the transmission/reception means in a case where the reception determination signal is received from the reception strength determining means, even when the first answering signal cannot be normally detected.

According to the present invention, the second request signal can be transmitted even in a case where the first answering signal corresponding to the first request signal from the registered portable device cannot be normally received or in a case where the signal cannot be normally received due to a noise. Accordingly, there is no need to reattempt the verification communication from a start, thereby making it possible to suppress power consumption, reduce a verification time, and improve responsiveness of the on-vehicle device.

Further, the first answering signal can be transmitted simultaneously from a plurality of portable devices, thereby making it possible to reduce the verification time.

BRIEF DESCRIPTION OF THE DRAWINGS

In the accompanying drawings:

FIG. 6 is a flowchart according to a fourth embodiment of the present invention.

DESCRIPTION OF THE PREFERRED EMBODIMENTS

Embodiment 1

Figure 1:
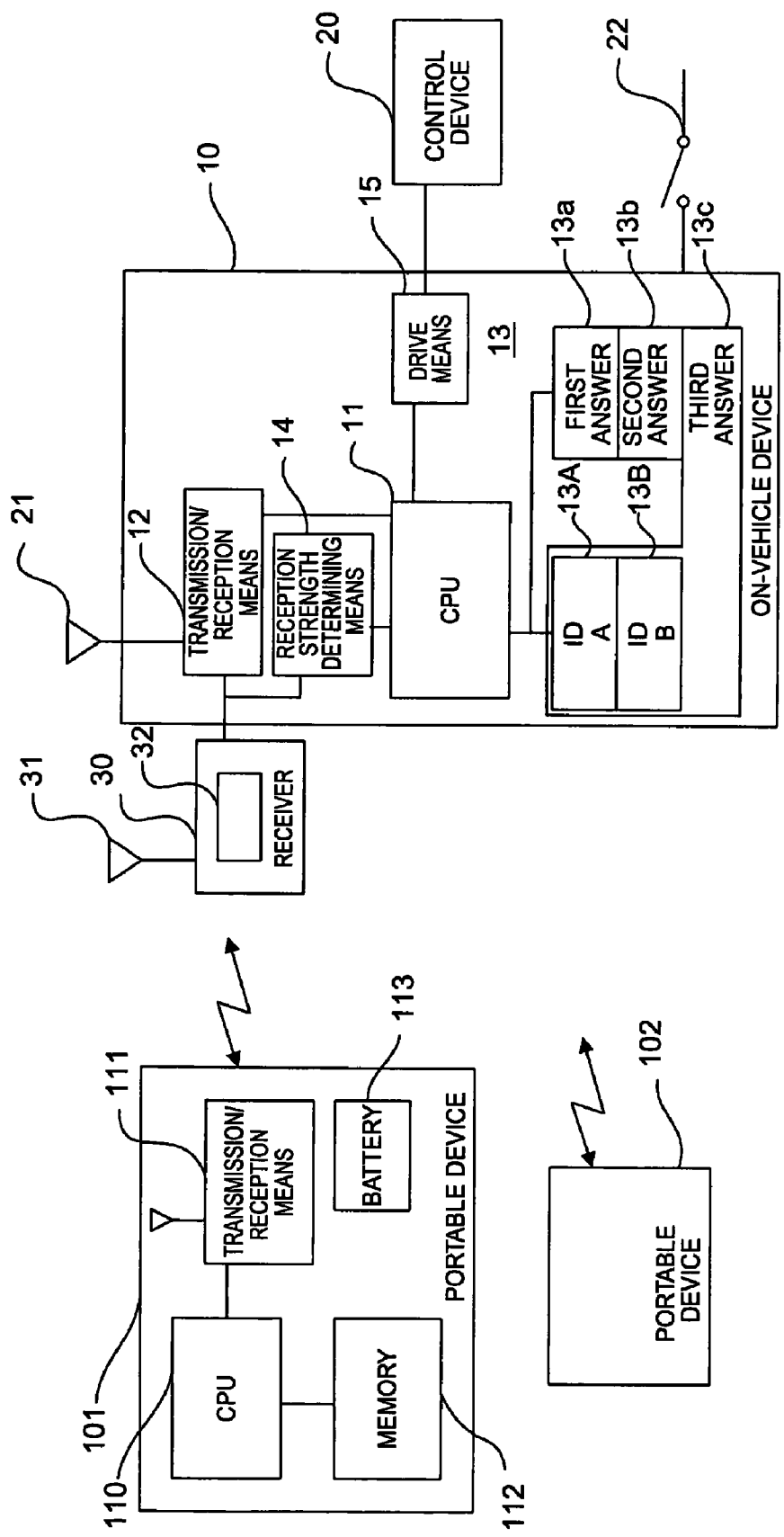
FIG. 1 is a block diagram showing a configuration of an electronic key apparatus for vehicle according to the present invention.

FIG. 1 is a block diagram showing a configuration of an electronic key apparatus for vehicle according to the present invention. The electronic key apparatus for vehicle shown in FIG. 1 includes an on-vehicle device 10 mounted on a predetermined position of the vehicle, and portable devices 101 and 102 possessed by a user. In a case where the portable devices 101 and 102 communicate with each other by the on-vehicle device 10, and ID codes for the portable devices 101 and 102 have been verified, the electronic key apparatus for a vehicle activates a control device 20, such as door locking/unlocking device or an engine starting device, which is mounted on the vehicle. The on-vehicle device 10 includes a CPU 11 serving as control means, transmission/reception means 12 for communicating with the portable devices 101 and 102, a memory 13 which stores first to third answering signals 13a to 13c and contains ID codes 13A and 13B for the portable devices, a reception strength determining means 14 for outputting a reception determination signal for determining that the first answering signal from the portable device has been received, based on a reception strength of a reception signal, and drive means 15 for outputting a control signal to the control device 20 of the vehicle.

In this case, the CPU 11 sequentially transmits, to the portable devices 101 and 102 through the transmission/reception means 12, a first request signal for determining the registered portable device, a second request signal for identifying the number of the registered portable device, and a third request signal for verifying an ID code for the registered portable device, according to matching by a comparison result between the request signal and the answering signal, to sequentially receive the first to third answering signals from the portable devices based on the transmission, sequentially compares the first to third answering signals from the portable devices with the first to third answering signal stored in the memory 13 every time the first to third answering signals are received from the portable devices, and controls the drive means 15 in a case where the ID code for the finally registered portable device has been verified based on the comparison result, thereby controlling the control device 20 to output a control signal. Even when the first answering signal cannot be normally detected, in a case where the reception determination signal has been received from the reception strength determining means 14, the CPU 11 enables the portable devices 101 and 102 to transmit the second request signal through the transmission/reception means 12.

In FIG. 1, the portable device 101 is represented as a portable device A, and the portable device 102 is represented as a portable device B. Reference numeral 21 denotes a transmission antenna; 22, a switch provided to the vehicle; and 30, a receiver. The receiver 30 includes a reception antenna 31 and a reception strength measuring means 32.

As basic operations of the on-vehicle device 10, the first request signal for determining whether there is a registered portable device is periodically transmitted to the portable devices 101 and 102 possessed by a user from the transmission antenna 21 through the transmission/reception means 12 based on the control of the CPU 11. The portable devices 101 and 102 each transmit the first answering signal in response to the first request signal.

The on-vehicle device 10 receives the first answering signal from the portable devices 101 and 102 through the reception antenna 31, the reception strength measuring means 32, and the transmission/reception means 12. The CPU 11 decrypts the received contents, reads out the first answering signal 13a stored in the memory 13, and compares the first answering signal 13a with the received first answering signal. When the first answering signal 13a stored in the memory 13 matches the received first answering signal, the second request signal for identifying numbers of the registered portable devices 101 and 102 is transmitted to the portable devices 101 and 102 possessed by the user.

Further, even when a comparison result shows that the first answering signal does not match the received first answering signal, in a case where it is judged that the first answering signal has been transmitted, based on the reception strength by the reception strength determining means 14, according to the signal read out from the reception strength measuring means 32, the CPU 11 transmits the second request signal. In response to this, the portable devices 101 and 102 each transmit the second answering signal corresponding to the registered portable device number.

The CPU 11 of the on-vehicle device 10 reads out and compares the received second answering signal and the second answering signal 13b stored in the memory 13, and if the signals match, the registered portable device number is decrypted during a time period between the completion of the transmission of the second request signal and the completion of the reception of the second answering signal. Then, the third request signal for authenticating the ID code for the registered portable device is transmitted to the portable devices detected through the second answering signal. The portable devices 101 and 102, which have been requested by the third request signal, each transmit the third answering signal containing ID information read out from a built-in memory 112.

The CPU 11 of the on-vehicle device 10 decrypts the received third answering signal, and reads out the third answering signal 13c containing IDA (13A), IDB (13B), and IDC (13C) stored in the memory, and compares the received third answering signal and the third answering signal 13c. When the ID codes stored in the memory 13 matches the received contents, so-called verification is completed, and the CPU 11 outputs a control signal through the drive means 15. As a result, the control device 20 operates to allow doors to lock/unlock or the engine of the vehicle to start through, for example, input of the switch 22 provided to the vehicle.

On the other hand, the portable devices 101 and 102 have the similar structure, so only the portable device 101 is herein described. The portable device 101 includes transmission/reception means 111, the memory 112, and a battery 113. In the memory 112, IDs for each of the portable devices, an ID for the registered on-vehicle device, and portable device numbers are registered.

As basic operations of the portable device 101, the transmission/reception means 111 receives the first to third request signals from the on-vehicle device 10, and the CPU 110 first judges, based on the received contents, whether the request signal requests the portable device 101. The first request signal contains a part of the ID for the registered on-vehicle device, the second request signal contains the ID for the registered on-vehicle device, and the third request signal contains the portable device number. For this reason, in a case where the signal contains an ID for a portable device or a portable device number that are not registered in the memory 112, the portable device 101 transmits no answering signal. When the request signal is requesting the portable device 101, the CPU 110 reads out and encrypts the answering signal stored in the memory 112, and transmits the encrypted answering signal from the transmission/reception means 111.

In this case, since it is unknown which portable device is used by the user, the on-vehicle device 10 periodically transmits the request signal to make sure that the registered portable device is present in the specific area of the vehicle (e.g., area in the vicinity of the doors in a case where the doors are unlocked). In order to improve the responsiveness (e.g., responsiveness to unlocking of doors), it is necessary to periodically transmit the request signal even in a case where the portable device 101 is not present in the specific area. However, it is a waste of time and power to periodically transmit all the information necessary for every periodical verification. Further, in a case where the answering signals from the portable devices are transmitted with a delay for each registered portable device to prevent the interference of the signals from occurring, a longer time for the communication and verification is required. Accordingly, the answering signals of the portable devices are simultaneously transmitted from the portable devices, and the on-vehicle device performs judgment not only by comparing communication signal data but also based on the reception strength, thereby making it possible to eliminate the necessity of retrying the communication from the start to save the communication time and power.

Figure 2:
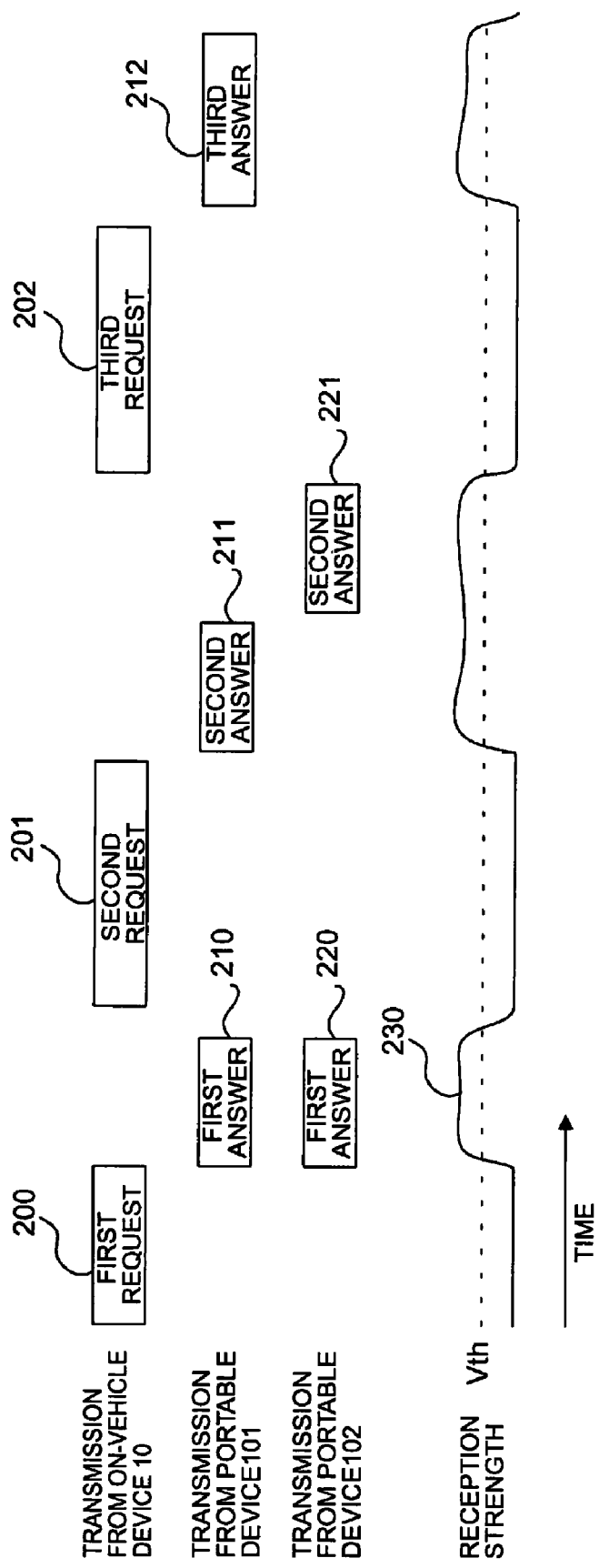
FIG. 2 is a time chart showing communication timings in time series in a case where portable devices 101 and 102 registered for specific areas are possessed by a user.
Figure 3:
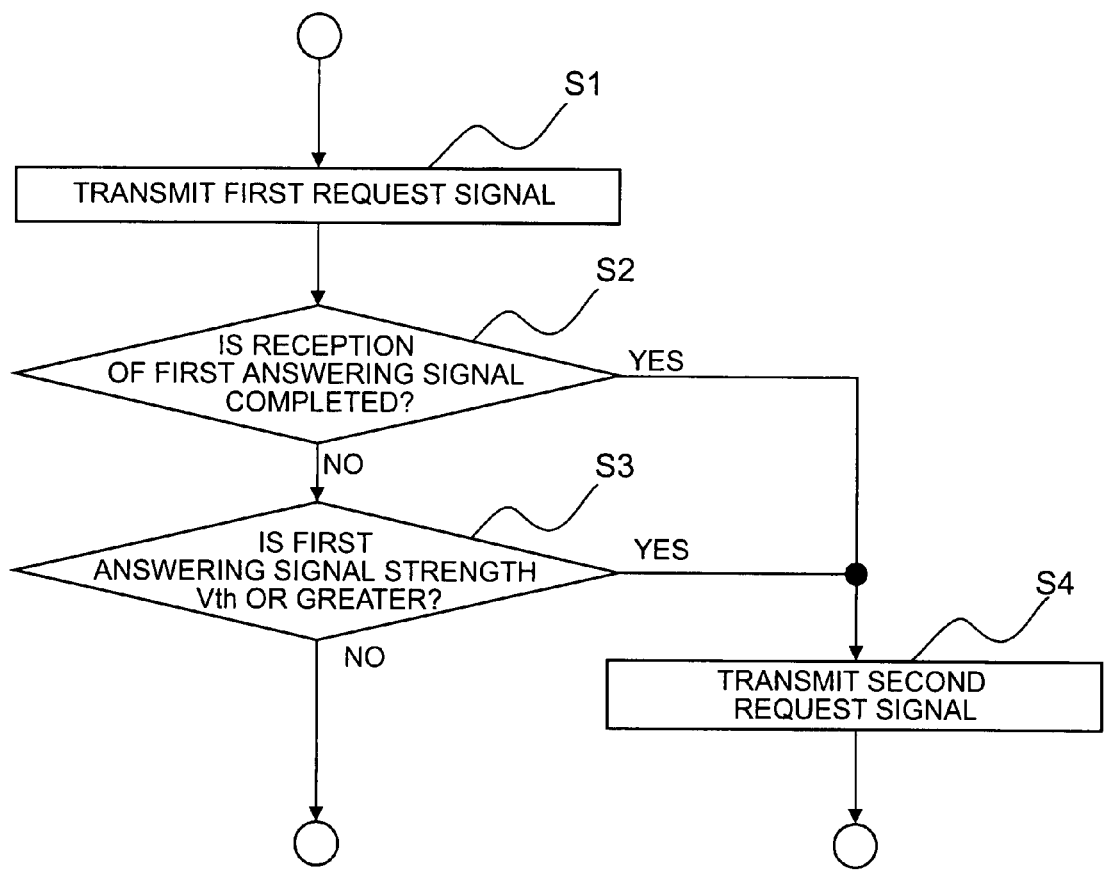
FIG. 3 is a flowchart according to a first embodiment of the present invention.

Next, with reference to FIGS. 2 and 3, a description is made of a communication method employed in a case where both the registered portable devices, which are being possessed by the user, approach the specific area of the vehicle (e.g., area in the vicinity of the doors in a case where the doors are unlocked). FIG. 2 shows communication timings in time series in a case where the portable devices 101 and 102 registered for the specific area are possessed by the user. FIG. 3 is a flowchart showing processing of determining whether the second request signal is to be transmitted after the CPU 11 of the on-vehicle device 10 transmits the first request signal.

In order to determine whether the registered portable devices 101 and 102 approach the specific area, the CPU 11 of the on-vehicle device 10 periodically transmits a first request signal 200 (Step S1). Upon reception of the first request signal 200, the portable device 101 transmits a first answering signal 210 in response to the first request signal 200. The portable device 102 having received the same first request signal 200 transmits a first answering signal 220 which is the same as that transmitted by the portable device 101 at the same timing.

The CPU 11 of the on-vehicle device 10 receives the first answering signals 210 and 220 that have been transmitted at the same timing, and compares the received signals with the first answering signal 13a stored in the memory 13. When the received signals and the first answering signal 13a are identical with each other (YES in Step S2), the CPU 11 transmits the second request signal 201 (Step S4) for identifying the registered portable device number.

Also even in a case where the CPU 11 of the on-vehicle device 10 cannot receive the signals (NO in Step S2), though the portable devices 101 and 102 have normally transmitted the signals, due to a noise generated in the signals which is caused by, for example, transmitting the signals at the same timing, the CPU 11 of the on-vehicle device 10 reads out the reception strength of the signal received through the reception strength measuring means 32 at a timing when the first answering signal is received, and the reception strength determining means 14 determines that the reception strength is equal to or greater than a predetermined value Vth. When it is determined that the first answering signals from the portable devices have been received (YES in Step S3), the CPU 11 of the on-vehicle device 10 transmits the second request signal 201 (Step S4) for identifying the registered portable device number.

The portable device 101 having received the second request signal 201 transmits a second answering signal 211 in response to the second request signal 201. The portable device 102 having received the same second request signal 201 transmits a second answering signal 221 which is the same as that transmitted by the portable device 101 at a timing when a certain time period (e.g., 5 ms), which is unique to the portable device number, has been elapsed so that the second answering signal 221 does not overlap the second answering signal 211.

The CPU 11 of the on-vehicle device 10 receives the second answering signals 211 and 221 that have been transmitted at different timings. After the second request signal has transmitted the second request signal, the CPU 11 reads out the second answering signal 13b stored in the memory 13, and compares the received signals and the read signal. In a case where the received signals are identical with the read signal, the CPU 11 transmits a third request signal 202 for verifying the registered portable device to the detected specific portable device 101.

The portable device 101 having received the third request signal compares the third request signal 202 with the portable device number stored in the memory 112. When the signal matches the portable device number, the CPU 11 transmits a third answering signal 212 containing an ID unique to the portable device corresponding to the third request signal.

When the CPU 11 of the on-vehicle device 10 reads out the received third answering signal and the third answering signal matches the ID of the portable device stored in the memory 13 to thereby establish the verification by cipher communication, the CPU 11 performs, for example, unlocking control in a case of receiving an input of the switch 22 mounted in the vicinity of the door of the vehicle.

As described above, according to the first embodiment, even when the CPU 11 of the on-vehicle device 10 cannot receive the first answering signal normally in Step S2, the CPU 11 determines that the portable devices are present based on the reception strength of the first answering signals in Step S3, and can transmit the second request signal to the portable devices. In addition, the CPU 11 can receive the first answering signals simultaneously from a plurality of portable devices. Accordingly, a waiting time before the first answering signal is received is shortened, a communication time and verification time can be reduced, and power to be used can be saved.

Embodiment 2

Next, a second embodiment of the present invention will be described. In the above-mentioned first embodiment, it is judged that the first answering signals have been received by the reception strength determining means 14 when the reception strength of the reception signal is at the level of the predetermined value Vth or greater at the timing when the first answering signal is received. However, when the reception strength of the background exceeds the predetermined value Vth, it is determined that the first answering signal is constantly received. In the second embodiment, a method of changing a threshold value Vth of the reception strength in the main processing of the CPU 11 of the on-vehicle device 10 will be described with reference to FIG. 4.

The CPU 11 of the on-vehicle device 10 measures the reception strength of the first answering signal for each main period Tms and stores the measured reception strengths in the memory 13 (Step S11). Then, the CPU 11 performs moving average processing (Step S12) for the reception strengths for the past N times stored in the memory 13, and determines whether the obtained moving average exceeds the predetermined value Vth of the reception strength (Step S13). When the reception strength exceeds the predetermined value Vth, the CPU 11 changes the predetermined value Vth of the reception strength to a predetermined value equal to or greater than the moving average (Step S15). On the other hand, when the reception strength does not exceed the predetermined value Vth, the CPU 11 does not change the predetermined value Vth and advances to Step S14 to finish the processing.

According to the second embodiment, by the above-mentioned procedure, it is possible to prevent making an erroneous determination that the first answering signal is constantly received in response to the first request signal in a case where the reception strength of the background constantly exceeds the reception strength predetermined value Vth.

Embodiment 3

Figure 4:
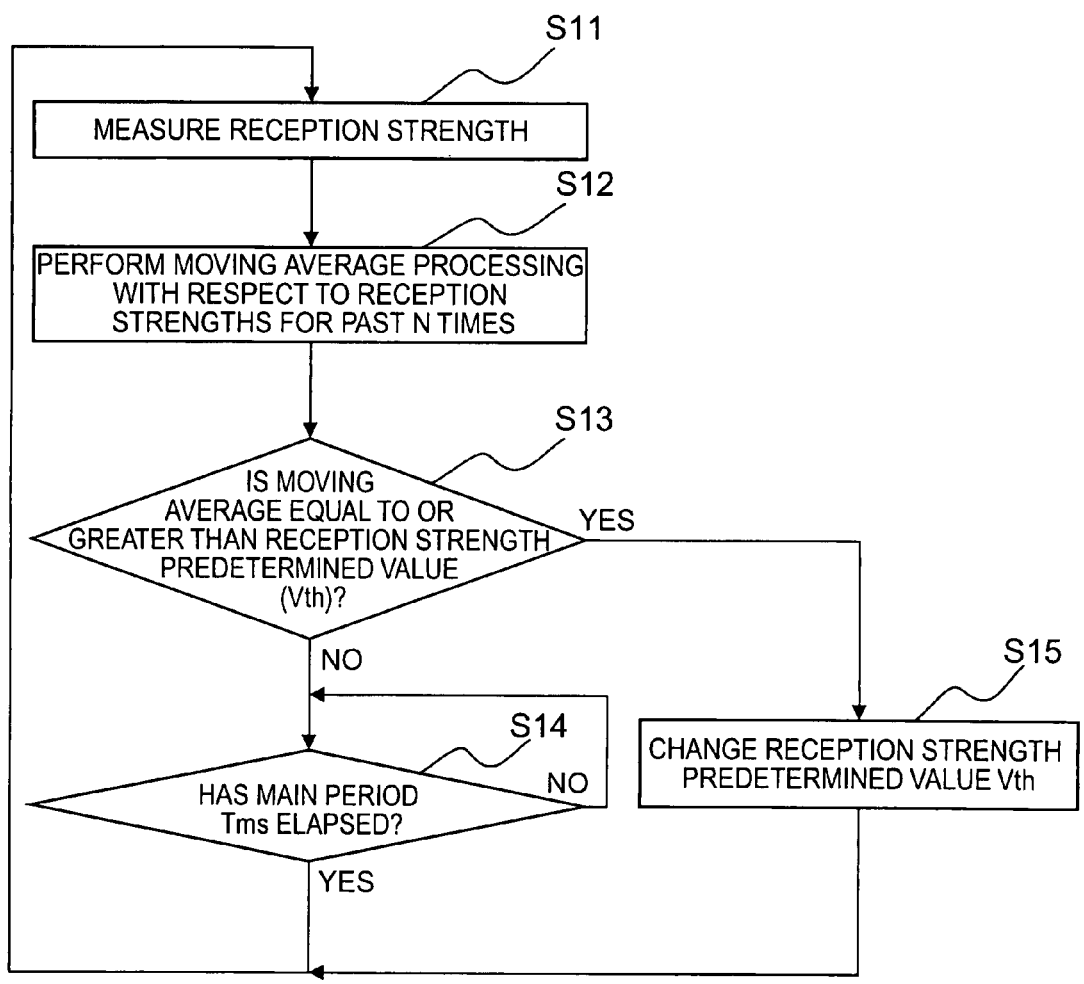
FIG. 4 is a flowchart according to a second embodiment of the present invention.
Figure 5:
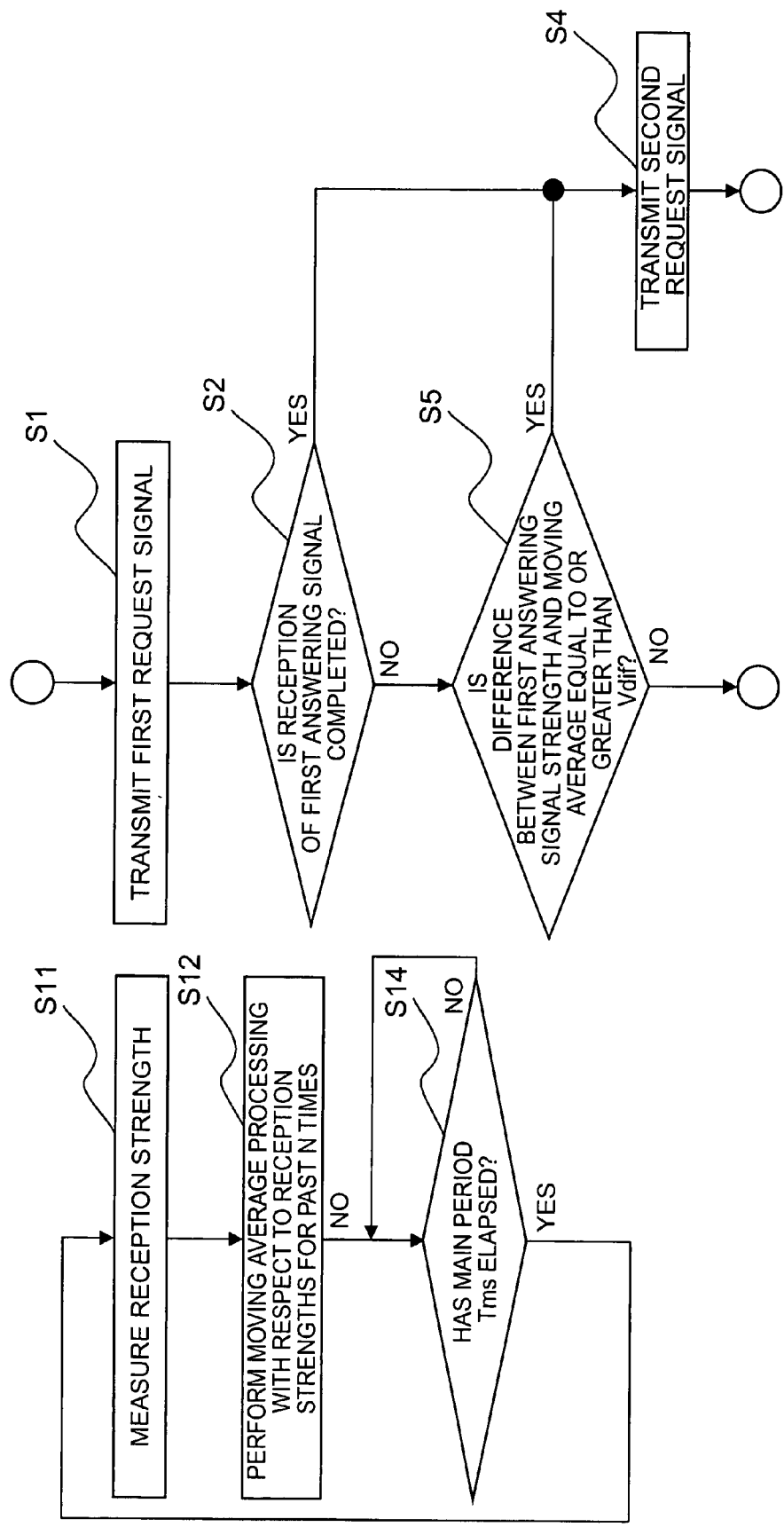
FIG. 5 is a flowchart according to a third embodiment of the present invention.

Next, a third embodiment of the present invention will be described. In the above-mentioned first embodiment, it is judged that the first answering signal has been received by the reception strength determining means 14 when the reception strength of the reception signal is at the level of the predetermined value Vth or greater at the timing when the first answering signal is received. However, when the reception strength of the background exceeds the predetermined value Vth, it is judged that the first answering signal is constantly received. In the third embodiment, a method in which the CPU 11 of the on-vehicle device 10 transmits the second request signal according to a change amount of the reception strength will be described with reference to FIG. 5. Components identical with those FIGS. 3 and 4 are denoted by the same reference symbols.

The CPU 11 of the on-vehicle device 10 measures the reception strengths (Step S11) in cases other than a case where the portable devices 101 and 102 each transmit the answering signal in response to the request signal of the on-vehicle device for each main period Tms, and stores the measured reception strengths in the memory 13. Then, the CPU 11 performs moving average processing for the reception strengths for the past N times stored in the memory 13, and stores the obtained moving average in the memory 13 (Step S12).

Further, in order to determine whether the portable devices 101 and 102 are present in the specific area, the CPU 11 transmits the first request signal to the portable devices 101 and 102, and then judges whether the first answering signals have been received (Steps S1 and S2). Even in a case where the CPU 11 cannot receive the signals, though both the portable devices 101 and 102 have transmitted the signals normally, due to a noise generated in the signal which is caused when, for example, both the portable devices 101 and 102 have transmitted the first answering signal at the same timing (NO in Step S2), the CPU 11 reads out the reception strength of the first answering signal through the reception strength measuring means 32, compares the read reception strength with the moving average of the reception strength stored in the memory 13, and judges whether the difference obtained by the comparison is the predetermined value Vdif or greater (Step S5). When the difference is a predetermined value Vdif or greater (YES in Step S5), it is determined that the first answering signals have been received from the portable devices, and the CPU 11 transmits the second request signal 201 for identifying the registered portable device number (Step S4).

According to the third embodiment, by the above-mentioned procedure, it is possible to prevent making an erroneous determination that the first answering signal is constantly received in response to the first request signal when the reception strength is changed even in a case where the reception strength of the background is constantly at a relatively high level.

Embodiment 4

Next, a fourth embodiment of the present invention will be described. In the above-mentioned first embodiment, it is determined that the first answering signal has been received by the reception strength determining means 14 when the reception strength of the reception signal is at the level of the predetermined value Vth or greater at the timing when the first answering signal is received. However, when the reception strength of the background exceeds the predetermined value Vth, it is determined that the first answering signal has constantly been received. In the fourth embodiment, a method in which the CPU 11 of the on-vehicle device 10 does not make a determination based on the reception strength in a case where the reception strength constantly exceeds the predetermined value Vth will be described with reference to FIG. 6. Components identical with those of FIGS. 3 and 4 are denoted by the same reference symbols.

The CPU 11 of the on-vehicle device 10 measures the reception strengths for each main period Tms (Step S11). Then, the CPU 11 determines whether the measured reception strength is equal to or greater than the predetermined value Vth (Step S16). When the reception strength exceeds the predetermined value Vth (YES in Step S16), the CPU 11 adds a count value of a reception strength predetermined value exceeding counter (Step S17). When the reception strength does not exceed the predetermined value Vth (NO in Step S16), the CPU 11 subtracts the count value of the counter (Step S18), and stores the reception strength in the memory 13.

Then, the CPU 11 determines whether the count value stored in the memory 13 is a predetermined value Nth or greater (Step S19). When the count value is equal to or greater than the predetermined value Nth (YES in Step S19), the CPU 11 performs setting of a first answering signal determination prohibiting state based on the reception strength (Step S19). On the other hand, when the count value is smaller than the predetermined value Nth (NO in Step S19), the CPU 11 releases the first answering signal determination prohibiting state based on the reception strength (Step S20).

According to the fourth embodiment, by the above-mentioned procedure, it is possible to prevent an erroneous determination from being made, in which the first answering signal is judged to have constantly been received in response to the first request signal in a case where the reception strength of the background is constantly at a relatively high level or in a case where outputs of a high intensity are constantly transmitted due to a failure of the reception strength measuring means for some reasons.

Therefore, it is possible to suppress the phenomenon in which, when the reception strength is constantly at the high level, it is determined that the portable devices are present based on the reception strength at the reception timing of the first answering signal even when the portable devices are not present so that the second request signal is constantly transmitted, which makes the communication time longer due to transmission of unnecessary signals and increases wasteful power consumption.

The present invention can be applied not only to an electronic key apparatus for a vehicle, but also to an electronic key apparatus for transportations such as a bicycle, a ship, and an aircraft.

What is claimed is:

1. An electronic key apparatus for a vehicle, comprising:
an on-vehicle device mounted on a vehicle;
a plurality of portable devices possessed by a user, each portable device having a unique ID code, a number and a transmission time period unique to the number; and
a control device mounted on the vehicle, wherein:
the electronic key apparatus for a vehicle activates the control device in a case where the on-vehicle device has verified ID codes for the portable devices through communication between the portable devices and the on-vehicle device;
the on-vehicle device comprises:
transmitter/receptor for communicating with the portable devices;
a memory for storing a first answering signal, a second answering signal, and a third answering signal containing the ID codes for the plurality of portable devices, respectively;
reception strength determiner for outputting a reception determination signal for determining that the first answering signal from the plurality of portable devices has been received, based on a reception strength of a reception signal;
a driver for outputting a control signal to the control device of the vehicle; and
a controller for:
sequentially transmitting, to the plurality of portable devices through the transmitter/receptor, a first request signal for determining whether the plurality of portable devices approach a specific area, a second request signal for identifying a number of a registered portable device, and a third request signal for verifying an ID code for the registered portable device, according to a matching result of comparison between the request signals and the answering signals,
sequentially receiving the first answering signal, the second answering signal, and the third answering signal from the plurality of portable devices based on the transmission,
sequentially comparing the first answering signal, the second answering signal, and the third answering signal sent from the plurality of portable devices with the first answering signal, the second answering signal, and the third answering signal separately stored in the memory every time the first answering signal, the second answering signal, and the third answering signal are received from the plurality of portable devices, and
controlling the driver in a case where the ID code for a portable device finally registered is verified based on the comparison result; and
wherein the controller transmits the second request signal to the plurality of portable devices through the transmitter/receptor in a case where the reception determination signal is received from the reception strength determiner, even when the first answering signal cannot be normally detected, and the plurality of portable devices transmit the second answering signal at unique transmission timings for each portable device.

2. The electronic key apparatus for vehicle according to claim 1, wherein the reception strength determiner outputs the reception determination signal when the reception strength of the reception signal is at a level of a predetermined value or greater at a timing when the first answering signal is received.

3. The electronic key apparatus for vehicle according to claim 2, wherein the controller stores, in the memory, data of reception strengths for past N times of the first answering signal measured every predetermined period, and changes the predetermined value according to the reception strength in a case where a moving average obtained by subjecting the stored data of the reception strengths to moving average processing is the predetermined value or greater.

4. The electronic key apparatus for vehicle according to claim 1, wherein the controller stores, in the memory, data of reception strengths for the past N times of the first answering signal measured every predetermined period, compares a moving average obtained by subjecting the stored data of the reception strengths to moving average processing with the reception strength of the first answering signal at a timing when the first answering signal is received, determines that the first answering signal is detected in a case where a difference between the moving average and the reception strength of the first answering signal is at a predetermined level or higher, and transmits the second request signal.

5. The electronic key apparatus for vehicle according to claim 1, wherein the controller adds a count value when the reception strength of the first answering signal measured every predetermined period is the predetermined value or greater and subtracts the count value when the reception strength of the first answering signal is smaller than the predetermined value, and sets the first answering signal to a reception determination prohibiting state when the count value is the predetermined value or greater, and releases the reception determination prohibiting state when the count value is smaller than the predetermined value.

6. The electronic key apparatus for vehicle according to claim 1,
wherein the transmitter/receptor of the on-vehicle device is configured to transmit the first request signal to the portable devices,
wherein the portable devices are configured to transmit the first answering signal in response to the first request signal,
wherein the controller is configured to compare the first answering signal received from the portable devices with the first answering signal stored in the memory,
wherein the transmitter/receptor is configured to transmit the second request signal when the controller is unable to verify that the first answering signal received from the portable devices matches the first answering signal stored in the memory and the reception strength determiner determines that the first answering signal was received from the portable devices based on the reception strength of the first answering signal,
wherein the portable devices are configured to transmit the second answering signal in response to the second request signal,
wherein the transmitter/receptor is configured to transmit the third request signal when the controller verifies that the second answering signal received from the portable devices matches the second answering signal stored in the memory, wherein the portable devices are configured to transmit the third answering signal in response to the third request signal, and wherein the controller is configured to control the driver when the controller verifies that the third answering signal received from the portable devices matches the third answering signal stored in the memory.

7. The electronic key apparatus for vehicle according to claim 1, wherein the first answering signal cannot be normally detected when the controller is unable to verify that the first answering signal received from the portable devices matches the first answering signal stored in the memory.

8. The electronic key apparatus for vehicle according to claim 1, wherein each of the plurality of portable devices are configured to transmit the first answering signal simultaneously.

* * * * *